(12) United States Patent
Vanbesien et al.

(10) Patent No.: US 8,691,482 B2
(45) Date of Patent: Apr. 8, 2014

(54) POWDER COATED CARRIER

(71) Applicant: Xerox Corporation, Norwalk, CT (US)

(72) Inventors: Daryl W Vanbesien, Burlington (CA); Michael Steven Hawkins, Cambridge (CA); Corey Tracy, Mississauga (CA); Richard P N Veregin, Mississauga (CA); Karen A Moffat, Brantford (CA); Paul Joseph Gerroir, Oakville (CA); Thomas E Enright, Tottenham (CA); Valerie Farrugia, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/907,868

(22) Filed: Jun. 1, 2013

(65) Prior Publication Data

US 2013/0260305 A1  Oct. 3, 2013

Related U.S. Application Data

(63) Continuation of application No. 13/295,067, filed on Nov. 12, 2011, now Pat. No. 8,461,252.

(51) Int. Cl.
*C09D 133/14* (2006.01)
*G03G 9/113* (2006.01)
*C08L 33/02* (2006.01)

(52) U.S. Cl.
USPC ............. 430/108.5; 427/385.5; 524/553; 524/556; 524/745; 526/225; 526/317.1; 526/328

(58) Field of Classification Search
USPC ........ 524/553, 556, 745; 526/225, 317.1, 328
See application file for complete search history.

*Primary Examiner* — Vu A Nguyen
(74) *Attorney, Agent, or Firm* — MDIP LLC

(57) ABSTRACT

The instant disclosure describes methods for preparing latex resins for coated carriers using surfactant partitioning, which resins exhibit both lower ζ potential and greater latex stability, while not adversely affecting particle size, toner charge or other metrics.

20 Claims, No Drawings

POWDER COATED CARRIER

FIELD

The instant disclosure relates generally to carrier resins, and specifically to a method of producing coated carriers with increased shelf life, where such a method increases surfactant loading without impacting latex size and lowers $\zeta$ (zeta) potential; developers comprising said carriers and toner; devices comprising said developers; imaging device components comprising said developers; imaging devices comprising said developers; images, and so on.

BACKGROUND OF THE INVENTION

Two part developers comprise a toner and a carrier. Often the carrier is coated, for example, with a resin. Certain emulsion-aggregation (EA) toners have relatively low melting point (sometimes referred to as low-melt, ultra low melt or ULM toner) which allows for more energy efficient and faster printing. The use of additives (e.g., surfactants) with EA toner particles may be important in realizing optimal toner performance, including in the area of shelf life for cyclic aliphatic acrylate and amino charged control monomer carriers in combination with polyester resin toners. Thus, there remains a continual need for improving carriers in the formation of developers.

SUMMARY

The instant disclosure describes methods for preparing latex resins for coating carriers for two part developers using surfactant partitioning during coating preparation, which resins exhibit lower $\zeta$ potential, greater latex emulsion stability, larger latex particle size or a combination thereof, while not adversely affecting toner charge or other metrics.

In embodiments, a method for preparing a latex resin is disclosed including preparing a solution of at least one first surfactant in a mixing vessel; separately mixing together at least one second surfactant and at least one latex resin-forming preparation to form a mixture; transferring a portion of the mixture to the mixing vessel to form a latex seed; optionally adding an initiator to the seed; combining the remaining portion of the mixture into the mixing vessel and allowing the combined mixture in the misting vessel to form particles. The particles can be dried to a powder form. Adding surfactant(s) in portions increases surfactant loading without impacting latex resin size as compared to a latex resin prepared in the absence of partitioning of the surfactant(s) into plural introductions into the reaction mixture.

In embodiments, a latex resin prepared by the above method is disclosed.

In embodiments, a method of preparing a coated particle is disclosed including contacting the above latex resin and a carrier, where the carrier can comprise a core, such as, a ferrite core and optionally a pigment, such as, a black pigment, such as, a carbon black, and optionally a based coating on said core; optionally fusing the resin to the carrier core; optionally heating the fused core and resin to permit flow of the resin over the core; cooling the resulting coated carrier; and recovering the cooled carrier.

In embodiments, a coated carrier prepared by the above method and comprising a latex resin of interest on surface portions of a core is disclosed.

In embodiments, a developer including the above coated carrier and a toner is disclosed, where the coated carrier is stable for at least one month. In embodiments, the developer is an ultra low melt developer.

DETAILED DESCRIPTION

The present disclosure describes semi-continuous emulsion polymerization in which surfactant amount is partitioned and introduced in stages during the formation of toner such that a desired particle size is achieved, while the $\zeta$ potential is sufficient to provide a stable dispersion and shelf life of the emulsion. One or a plurality of surfactants can be used. The $\zeta$ potential often is measured as a voltage. The voltage can be a negative value with lower potentials having lower negative voltage values. Thus, −30 mV is lower than −20 mV. The $\zeta$ potential also can be a positive value. As known, potential often uses as a point of reference, zero, and in essence, it is the absolute value of a metric without regard to the sign. Thus, in embodiments, a higher potential is also one which is one which is more distant from zero, such as, in the example above, −30 mV is a higher potential than −20 mV.

In embodiments, a method for preparing a latex resin is disclosed including providing a solution of water and at least one first surfactant in a first mixing vessel; combining water and at least one second surfactant and at least one latex resin-forming preparation, such as monomers that polymerize to form a resin, to form a mixture; transferring a portion of the mixture to the mixing vessel to form a latex seed; optionally adding an initiator to the seeded mixing vessel; introducing the remaining portion of the mixture into the mixing vessel to form particles; and optionally drying the particles to a powder form, where introducing surfactant in portions into the polymerization reaction increases surfactant loading without impacting latex resin size as compared to a latex resin prepared in the absence of partitioning of surfactant into portions introduced at varying stages of particle formation.

For the purposes of the disclosure, a, "carrier resin," or a, "carrier latex," is a polymer that is affixed to a portion of the surface of a core particle. A carrier resin is distinguishable from, for example, a latex used to make a toner particle, for example, by the monomers used to make the two distinct resins.

A, "ultra low melt," toner or developer is one which has a melting temperature of less than about 120° C., less than about 110° C., less than about 100° C.

In the present disclosure, use of the singular includes the plural unless specifically stated otherwise. In the present disclosure, use of, "or," means, "and/or," unless stated otherwise. Furthermore, use of the term, "including," as well as other forms, such as, "includes," and, "included," is not limiting.

For the purposes of the instant disclosure, "toner," "developer," "toner composition," and "toner particles," may be used interchangeably, and any particular or specific use and meaning will be evident from the context of the sentence, paragraph and the like in which the word or phrase appears. In embodiments, a toner is a powdery ink used dry or suspended in a liquid to produce a photocopy.

As used herein, the modifier, "about," used in connection with a quantity is inclusive of the stated value and has the meaning dictated by the context (for example, it includes at least the degree of error associated with the measurement of the particular quantity). When used in the context of a range, the modifier, "about," should also be considered as disclosing the range defined by the absolute values of the two endpoints. For example, the range, "from about 2 to about 4," also discloses the range, "from 2 to 4."

By, "negative additives that are negatively chargeable to a reference carrier," is meant that the additives are negatively charging relative to the toner surface measured by determining the toner triboelectric charge with and without the additive. Similarly, by, "positive additives that are positively chargeable to a carrier," is meant that the additives are positively charging relative to the toner surface measured by determining the toner triboelectric charge with and without the additive.

Negative additives that are negatively chargeable to a carrier include, for example, silica particles, alumina particles or any small-sized particles (e.g., from about 7 to about 100 nm in volume average particle diameter as determined by any suitable technique) including, for example, polymeric microspheres, optionally treated with a composition rendering the particles negatively chargeable to a carrier on triboelectric contact therewith. The treating material may be, for example, a fluorosilane, for example, a fluorosilane such as exemplified in U.S. Pat. No. 4,973,540, incorporated herein by reference in entirety, other halogen-containing organosilanes, such as, described in U.S. Pat. No. 5,376,172, incorporated herein by reference in entirety, silazanes, siloxanes and the like.

Carrier

Various suitable solid core materials may be used for the carriers and developers of the present disclosure. Characteristic core properties include those that, in embodiments, will enable the toner particles to acquire a positive charge or a negative charge, and carrier cores that will permit desirable flow properties in the developer reservoir present in an electrophotographic imaging apparatus. Other desirable properties of the core include, for example, suitable magnetic characteristics that permit magnetic brush formation in magnetic brush development processes; desirable mechanical aging characteristics and desirable surface morphology to permit high electrical conductivity of any developer including the carrier and a suitable toner.

Examples of carrier cores that may be used include iron and/or steel, such as, atomized iron or steel powders available from Hoeganaes Corporation or Pomaton S.p.A (Italy); ferrites, such as, Cu/Zn-ferrite containing, for example, about 11% copper oxide, about 19% zinc oxide and about 70% iron oxide, including those commercially available from D.M. Steward Corporation or Powdertech Corporation, Ni/Zn-ferrite available from Powdertech Corporation, Sr (strontium)-ferrite, containing, for example, about 14% strontium oxide and about 86% iron oxide, commercially available from Powdertech Corporation, and Ba-ferrite; magnetites, including those commercially available from, for example, Hoeganaes Corporation (Sweden); nickel; combinations thereof, and the like. Other suitable carrier cores are illustrated in, for example, U.S. Pat. Nos. 4,937,166, 4,935,326, and 7,014,971, the disclosure of each of which hereby is incorporated by reference in entirety, and may include granular zircon, granular silicon, glass, silicon dioxide, combinations thereof and the like. In embodiments, suitable carrier cores may have an average particle size of, for example, from about 20 μm to about 400 μm in diameter, from about 30 μm to about 300 μm in diameter, in embodiments, from about 40 μm to about 200 μm in diameter.

In embodiments, a ferrite may be used as the core, including a metal, such as, iron and at least one additional metal, such as, copper, zinc, nickel, manganese, magnesium, calcium, lithium, strontium, zirconium, titanium, tantalum, bismuth, sodium, potassium, rubidium, cesium, strontium, barium, yttrium, lanthanum, hafnium, vanadium, niobium, aluminum, gallium, silicon, germamium, antimony, combinations thereof and the like.

In embodiments, the polymer particles obtained may be used to coat carrier cores of any known type by various known methods, and which carriers then are incorporated with a known toner to form a developer for electrophotographic printing.

In embodiments, carriers of the present disclosure may include a core, in embodiments a ferrite core, having a size of from about 20 μm to about 100 μm, in embodiments, from about 30 μm to about 75 μm, from about 40 μm to about 70 μm, containing from about 0.5% to about 10% by weight, in embodiments, from about 0.7% to about 5% by weight, from about 1% to about 4% of the polymer coating of the present disclosure, optionally including a pigment, such as, a black pigment.

The polymeric coating on the core metal includes a latex as taught herein. In embodiments, a latex copolymer utilized as the coating of a carrier core may include any polymer as known in the art, including, at least one aliphatic cycloacrylate, optionally, an acidic acrylate monomer and optionally, a pigment, such as, a black pigment, such as, a carbon black. Suitable aliphatic cycloacrylates which may be utilized in forming the polymer coating include, for example, methylmethacrylate, cyclohexylmethacrylate, cyclopropyl acrylate, cyclobutyl acrylate, cyclopentyl acrylate, cyclohexyl acrylate, cyclopropyl methacrylate, cyclobutyl methacrylate, cyclopentyl methacrylate, isobornyl methacrylate, isobornyl acrylate, combinations thereof and the like.

Charge control agents include, but are not limited to, acidic acrylates and dialkylaminoacrylates. Suitable acidic acrylates which may be utilized in forming the polymer coating include, for example, acrylic acid, methacrylic acid, β-carboxyethyl acrylate, combinations thereof and the like. Suitable dialkylaminoacrylates which may be utilized in forming the polymer coating include, for example, dimethylamino ethyl methacrylate (DMAEMA), 2-(dimethylamino) ethyl methacrylate, diethylamino ethyl methacrylate, dimethylamino butyl methacrylate, methylamino ethyl methacrylate, combinations thereof and the like.

Where the cycloacrylate is combined with a charge control agent, the cycloacrylate may be present in a copolymer utilized as a polymeric coating of a carrier core in an amount of from about 95% by weight of the copolymer to about 99.9% by weight of the copolymer, in embodiments, from about 98% by weight of the copolymer to about 99.7% by weight of the copolymer. The charge control agent may be present in such a copolymer in an amount of from about 0.1% by weight of the copolymer to about 5% by weight of the copolymer.

Methods for making the polymeric coating are within the purview of those skilled in the art and include, in embodiments, emulsion polymerization of the monomers to form a resin for use as a carrier coating.

In the polymerization process, the reactants may be added to water in a suitable reactor, such as, a mixing vessel. The appropriate amount of starting materials optionally may be dissolved in a solvent, an optional initiator may be added to the solution, and contacted with at least one surfactant to form an emulsion. A copolymer may be formed in the emulsion, which may then be recovered and used as the polymeric coating for a carrier particle.

Where utilized, suitable solvents include, but are not limited to, organic solvents, including, toluene, benzene, xylene, tetrahydrofuran, acetone, acetonitrile, carbon tetrachloride, chlorobenzene, cyclohexane, diethyl ether, dimethyl ether, dimethyl formamide, heptane, hexane, methylene chloride, pentane, combinations thereof and the like.

In embodiments, the latex for forming the polymeric coating may be prepared in an aqueous phase containing a surfactant or co-surfactant, optionally, under an inert gas, such as, nitrogen, where the aqueous phase containing water and surfactant is partitioned such that additional surfactant is added later in the polymerization. Surfactants which may be utilized with the resin to form a latex dispersion may be ionic or nonionic surfactants in an amount of from about 0.01 to about 15 wt % of the solids, in embodiments, of from about 0.1 to about 10 wt % of the solids, from about 0.5% to about 8 wt %.

Anionic surfactants which may be utilized include sulfates and sulfonates, sodium lauryl sulfate (SLS), sodium dodecylbenzene sulfonate, sodium dodecylnaphthalene sulfate, dialkyl benzenealkyl sulfates and sulfonates, acids such as abietic acid available from Aldrich, NEOGEN R™ and NEOGEN SC™ obtained from Daiichi Kogyo Seiyaku Co., Ltd., combinations thereof and the like. Other suitable anionic surfactants include, in embodiments, DOWFAX™ 2A1, an alkyldiphenyloxide disulfonate from The Dow Chemical Company and TAYCA POWER BN2060 from Tayca Corporation (Japan), which are branched sodium dodecyl benzene sulfonates.

Examples of cationic surfactants include, but are not limited to, ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, $C_{12}, C_{15}, C_{17}$-trimethyl ammonium bromides, combinations thereof and the like. Other cationic surfactants include cetyl pyridinium bromide, halide salts of quaternized polyoxyethylalkylamines, dodecylbenzyl triethyl ammonium chloride, MIRAPOL and ALKAQUAT available from Alkaril Chemical Company, SANISOL (benzalkonium chloride), available from Kao Chemicals, combinations thereof and the like. In embodiments, a suitable cationic surfactant includes SANISOL B-50 available from Kao Corp., which is primarily a benzyl dimethyl alkonium chloride.

Examples of nonionic surfactants include, but are not limited to, alcohols, acids and ethers, for example, polyvinyl alcohol, polyacrylic acid, methalose, methyl cellulose, ethyl cellulose, propyl cellulose, hydroxylethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, combinations thereof and the like. In embodiments commercially available surfactants from Rhone-Poulenc, such as, IGEPAL CA-210™, IGEPAL CA520™, IGEPAL CA720™, IGEPAL CO-890™, IGEPAL CO-720™, IGEPAL CO-290™, IGEPAL CA-210™, ANTAROX 890™ and ANTAROX 897™ may be utilized.

The choice of particular surfactants or combinations thereof, as well as the amounts of each to be used, are within the purview of those skilled in the art. In a semi-continuous polymerization process, the total amount of surfactant can be partitioned between the seeding stage and the particle growth stage. However, surfactant can be added at more than two time points an in embodiments, can be metered into the reaction mixture of a continuous and tonic basis.

In embodiments, latex polymerization increases surfactant loading without impacting latex particle size, and may exhibit ζ potential in stable ranges, including ζ potentials lower than about −55 mV, lower than about −60 mV, lower than about −65 mV, lower than about −70 mV. In embodiments, that is accomplished by partitioning the surfactant amount such that additional surfactant may be added at multiple time points during latex preparation, such as at and/or after seed particles have been generated. While not being bound by theory, particle size may be determined by the number of seed particles generated in the initial stages of the emulsion polymerization. Thus, it may be that as long as there is no secondary nucleation, more surfactant may be added later in the process to increase latex stability by decreasing the ζ potential and increasing latex stability, while having no adverse metrics including toner charging, coating efficiency, carrier conductivity and the like.

In embodiments, the surfactant loading may be increased by at least about 30%, at last about 70%, at least about 130%, at least about 200% or more, compared to preparing a latex resin in the absence of partitioning of the surfactant into portions which are added at plural time points during particle formation.

In embodiments, initiators may be added for formation of the latex utilized in formation of the polymeric coating. Examples of suitable initiators include water soluble initiators, such as, ammonium persulfate, sodium persulfate and potassium persulfate, and organic soluble initiators including organic peroxides and azo compounds including, Vazo peroxides, such as VAZO 64™, 2-methyl 2-2'-azobis propanenitrile, VAZO 88™, 2-2'-azobis isobutyramide dehydrate, and combinations thereof. Other water-soluble initiators which may be utilized include azoamidine compounds, for example 2,2'-azobis(2-methyl-N-phenylpropionamidine)dihydrochloride, 2,2'-azobis[N-(4-chlorophenyl)-2-methylpropionamidine]di-hydrochloride, 2,2'-azobis[N-(4-hydroxyphenyl)-2-methyl-propionamidine]dihydrochloride, 2,2'-azobis[N-(4-amino-phenyl)-2-methylpropionamidine] tetrahydrochloride, 2,2'-azobis[2-methyl-N(phenylmethyl) propionamidine]dihydrochloride, 2,2'-azobis[2-methyl-N-2-propenylpropionamidine]dihydrochloride, 2,2'-azobis[N-(2-hydroxy-ethyl)-2-methylpropionamidine]dihydrochloride, 2,2'-azobis[2(5-methyl-2-imidazolin-2-yl)propane]dihydrochloride, 2,2'-azobis[2-(2-imidazolin-2-yl)propane]dihydrochloride, 2,2w-azobis[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl) propane]di-hydrochloride, 2,2'-azobis{2-[1-(2-hydroxyethyl)-2-imidazolin-2-yl]propane}dihydrochloride, combinations thereof and the like.

Initiators may be added in suitable amounts, such as from about 0.1 to about 8 wt %, in embodiments, of from about 0.2 to about 5 wt % of the monomers.

In forming the emulsions, the starting materials, a first surfactant and water, optional solvent and optional initiator may be combined utilizing any means within the purview of those skilled in the art. In embodiments, the reaction mixture may be mixed for from about 1 minute to about 72 hours, in embodiments, from about 4 hours to about 24 hours (although times outside those ranges may be utilized), while keeping the temperature at from about 10° C. to about 100° C., in embodiments, from about 20° C. to about 90° C., in embodiments, from about 45° C. to about 75° C., although temperatures outside those ranges may be utilized. In embodiments, the temperature is kept at about 65° C.

Those skilled in the art will recognize that optimization of reaction conditions, temperature and initiator loading may be varied to generate polyesters of various molecular weight, and that structurally related starting materials may be polymerized using comparable techniques.

Then, at one or more stages during particle formation, more of the first surfactant or a second or more surfactant can be added to the polymerization reaction.

The resulting latex particles are at least about 85 nm in size, at least about 90 nm in size, at least about 95 nm in size.

Once the polymer or copolymer used as the coating for a carrier has been formed, it may be recovered from the emulsion by any technique within the purview of those skilled in the art, including filtration, drying, centrifugation, spray drying, combinations thereof and the like.

In embodiments, once obtained, the polymer or copolymer used as the coating for a carrier may be dried to powder form by any method within the purview of those skilled in the art, including, for example, freeze drying, optionally, in a vacuum, spray drying, combinations thereof and the like.

Particles of the polymer or copolymer may have a size of from about 40 nm to about 200 nm, in embodiments, from about 50 nm to about 150 nm, from about 60 nm to about 120 nm.

In embodiments, if the size of the particles of the dried polymeric coating is too large, the particles may be subjected to pulverizing, homogenizing, sonication and the like to further disperse the particles and break apart any agglomerates or loosely bound particles, thereby obtaining particles of the sizes noted above. Where utilized, a homogenizer, (that is, a high shear device), may operate at a rate of from about 6,000 rpm to about 10,000 rpm, in embodiments from about 7,000 rpm to about 9,750 rpm, for a period of time of from about 0.5 minutes to about 60 minutes, in embodiments from about 5 minute to about 30 minutes, although speeds and times outside these ranges may be utilized.

The polymers or copolymers utilized as the carrier coating may have a number average molecular weight ($M_n$), as measured by gel permeation chromatography (GPC) of, for example, from about 60,000 to about 400,000, in embodiments, from about 170,000 to about 280,000, and a weight average molecular weight ($M_w$) of, for example, from about 200,000 to about 800,000, in embodiments from about 400,000 to about 600,000, as determined by gel permeation chromatography using polystyrene standards.

The polymers or copolymers used as the carrier coating may have a glass transition temperature ($T_g$) of from about 85° C. to about 140° C., in embodiments, from about 95° C. to about 130° C.

In some embodiments, the carrier coating may include a conductive component, such as, a pigment, such as, a black pigment. Suitable conductive components include, for example, a carbon black.

There may be added to the carrier a number of additives, for example, charge enhancing additives, including particulate amine resins, such as melamine, and certain fluoropolymer powders, such as alkyl-amino acrylates and methacrylates, polyamides and fluorinated polymers, such as, polyvinylidine fluoride and poly(tetrafluoroethylene), and fluoroalkyl methacrylates, such as, 2,2,2-trifluoroethyl methacrylate. Other charge enhancing additives which may be utilized include quaternary ammonium salts, including distearyl dimethyl ammonium methyl sulfate (DDAMS), bis[1-[(3,5-disubstituted-2-hydroxyphenyl)azo]-3-(mono-substituted)-2-naphthalenolato(2-)]chromate(1-), ammonium sodium and hydrogen (TRH), cetyl pyridinium chloride (CPC), FANAL PINK® D4830, combinations thereof and the like, and other effective known charge agents or additives. The charge additive components may be selected in various effective amounts, such as from about 0.5 wt % to about 20 wt %, and from about 1 wt % to about 3 wt %, based, for example, on the sum of the weights of polymer/copolymer, conductive component, and other charge additive components. The addition of conductive components may act to increase the negative triboelectric charge imparted to the carrier, and therefore, further increase the negative triboelectric charge imparted to the toner in, for example, an electrophotographic development subsystem. The components may be included by roll mixing, tumbling, milling, shaking, electrostatic powder cloud spraying, fluidized bed mixing, electrostatic disc processing and an electrostatic curtain, as described, for example, in U.S. Pat. No. 6,042,981, the disclosure of which hereby is incorporated by reference in entirety. The carrier coating then may be fused to the carrier core, for example, in either a rotary kiln or by passing through a heated extruder apparatus.

Conductivity is important for semi-conductive magnetic brush development to enable good development of solid areas which otherwise may be weakly developed. It has been found that addition of the polymeric coating of the present disclosure, optionally with a conductive component, such as, a pigment, such as, a black pigment, such as, a carbon black, may result in carriers with decreased developer triboelectric response with change of relative humidity of from about 20% to about 90%, in embodiments, from about 40% to about 80%, that the charge is more consistent when the relative humidity is changed, and thus there is less decrease in charge at high relative humidity, reducing background toner on the prints, and less increase in charge and subsequently less loss of development at low relative humidity, resulting in such improved image quality performance due to improved optical density.

As noted above, in embodiments, the polymeric coating may be dried, after which time it may be applied to the core carrier as a dry powder. Powder coating processes differ from conventional solution coating processes. Solution coating requires a coating polymer whose composition and molecular weight properties enable the resin to be soluble in a solvent in the coating process. That typically can require relatively low $M_w$ compared to a powder coating. The powder coating process does not require solvent solubility, but does require the resin to be coated as a particulate with a particle size of from about 10 nm to about 2 µm, in embodiments, from about 30 nm to about 1 µm, in embodiments from about 50 nm to about 400 nm.

Examples of processes which may be utilized to apply the powder coating include, for example, combining the carrier core material and polymer or copolymer coating by cascade roll mixing, tumbling, milling, shaking, electrostatic powder cloud spraying, fluidized bed mixing, electrostatic disc processing, electrostatic curtains, combinations thereof and the like.

When resin coated carrier particles are prepared by a powder coating process, the majority of the coating materials may be fused to the carrier surface, thereby reducing the number of toner impaction sites on the carrier. Fusing of the polymeric coating may occur by mechanical impaction, electrostatic attraction, heat, combinations thereof and the like.

Following application of the polymers or copolymers to the core, heating may be initiated to permit flow of the coating material over the surface of the carrier core. The concentration of the coating material, in embodiments, powder particles, and the parameters of the heating may be selected to enable the formation of a continuous film of the coating polymers on the surface of the carrier core or to permit only selected areas of the carrier core to be coated. In embodiments, the carrier with the polymeric powder coating may be heated to a temperature of from about 170° C. to about 280° C., from about 180° C. to about 260° C., in embodiments, from about 190° C. to about 240° C., for a period of time of, for example, from about 10 minutes to about 180 minutes, in embodiments, from about 12 minutes to about 150 minutes, from about 15 minutes to about 60 minutes, to enable the polymer coating to melt and to fuse to the carrier core. Following incorporation of the micropowder onto the surface of the carrier, heating may be initiated to permit flow of the coating material over the surface of the carrier core.

In embodiments, the micropowder may be fused to the carrier core in either a rotary kiln or by passing the particles through a heated extruder apparatus, see, for example, U.S. Pat. No. 6,355,391, the disclosure of which hereby is incorporated by reference in entirety.

In embodiments, the coating coverage encompasses from about 10% to about 100% of the surface area of the carrier core. When selected areas of the metal carrier core remain uncoated or exposed, the carrier particles may possess electrically conductive properties, such as, when the core material is a metal.

The coated carrier particles may then be cooled, in embodiments, to room temperature, and recovered for use in forming developer.

Thus, with the carrier compositions and processes of the present disclosure, there may be formulated developers with selected high triboelectric charging characteristics and/or conductivity values utilizing a number of different combinations.

Toners

Any latex resin may be utilized in forming a toner of the present disclosure. Such resins, in turn, may be made of any suitable monomer. Any monomer employed may be selected depending on the particular polymer to be utilized.

Examples of resins or polymers which may be utilized include, but are not limited to, poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), and poly(styrene-butyl acrylate-acrylonitrile-acrylic acid), and combinations thereof. The polymer may be block, random, or alternating copolymers.

In embodiments, the resins may have a $T_g$ of from about 30° C. to about 80° C., in embodiments, from about 35° C. to about 70° C. In further embodiments, the resins utilized in the toner may have a melt viscosity of from about 10 to about 1,000,000 Pa*S at about 130° C., in embodiments from about 20 to about 100,000 Pa*S at about 130° C.

In embodiments, the resins may be a polyester, such as, an amorphous resin, a crystalline resin and a combination thereof. In embodiments, the polymer includes the resins described in U.S. Pat. Nos. 6,593,049 and 6,756,176, the disclosure of each of which hereby is incorporated by reference in entirety. Suitable resins also may include a mixture of an amorphous polyester resin and a crystalline polyester resin as described in U.S. Pat. No. 6,830,860, the disclosure of which is hereby incorporated by reference in its entirety.

In embodiments, suitable amorphous resins include polyesters, polyamides, polyimides, polyolefins, polyethylene, polybutylene, polyisobutyrate, ethylene-propylene copolymers, ethylene-vinyl acetate copolymers, polypropylene, combinations thereof, and the like. Examples of amorphous resins which may be utilized include alkali sulfonated-polyester resins, branched alkali sulfonated-polyester resins, alkali sulfonated-polyimide resins, and branched alkali sulfonated-polyimide resins. Alkali sulfonated polyester resins may be useful in embodiments, such as the metal or alkali salts of copoly(ethylene-terephthalate)-copoly(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfo-isophthalate), copoly(propylene-butylene-terephthalate)-copoly(propylene-butylene-5-sulfo-isophthalate), copoly(propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly(ethoxylated bisphenol-A-5-sulfo-isophthalate), wherein the alkali metal is, for example, a sodium, lithium or potassium ion.

In embodiments, an unsaturated amorphous polyester resin may be utilized as a latex resin. Examples of such resins include those disclosed in U.S. Pat. No. 6,063,827, the disclosure of which hereby is incorporated by reference in entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate) and combinations thereof.

In embodiments, the resin may be a polyester resin formed by reacting a diol with a diacid in the presence of an optional catalyst.

Examples of diacids or diesters including vinyl diacids or vinyl diesters utilized for the preparation of amorphous polyesters include dicarboxylic acids or diesters such as terephthalic acid, phthalic acid, isophthalic acid, fumaric acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecane diacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The diacid or diester may be present, for example, in an amount from about 40 to about 60 mole % of the resin, in embodiments, from about 42 to about 52 mole % of the resin, in embodiments, from about 45 to about 50 mole % of the resin.

Examples of diols selected for the preparation of amorphous resins include aliphatic diols with from about 2 to about 36 carbon atoms, such as 1,2-ethanediol, 1,2-propanediol, 1,3-propanediol, 1,2-butanediol, 1,3-butanediol, 1,4-butanediol, 1,5-pentanediol, 1,6-hexanediol, 1,7-heptanediol, 1,8-octanediol, 1,9-nonanediol, 2,2-dimethylpropanediol, 2,2,3-trimethylhexanediol, heptanediol, dodecanediol, 1,4- cyclohexanedimethanol, 1,3-cyclohexanedimethanol, xylenedimethanol, cyclohexanediol, diethylene glycol, dipropylene glycol, dibutylene, bisphenol, 1,10-decanediol, 1,12-dodecanediol, and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like. The diol is, for example, selected in an amount of from about 45 to about 50 mole % of the resin. When present, an alkali sulfo-aliphatic diol can be present in an amount of from about 1 to about 10 mole % of the resin.

Examples of the alkylene oxide adducts of bisphenol include polyoxypropylene (2.2)-2,2-bis(4-hydroxyphenyl) propane, polyoxypropylene (3.3)-2,2-bis(4-hydroxyphenyl) propane, polyoxyethylene (2.0)-2,2-bis(4-hydroxyphenyl) propane, polyoxyethylene (2.2)-2,2-bis(4-hydroxyphenyl) propane, polyoxypropylene (2.0)-polyoxyethylene (2.0)-2,2-bis(4-hydroxyphenyl)propane, and polyoxypropylene (6)-2,2-bis(4-hydroxyphenyl)propane. The compounds may be used singly or as a combination of two or more thereof.

A, "crystalline polyester resin," indicates one that shows not a stepwise endothermic amount variation but a clear endothermic peak in differential scanning calorimetry (DSC). However, a polymer obtained by copolymerizing the crystalline polyester main chain and at least one other component is also called a crystalline polyester if the amount of the other component is 50% by weight or less.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), alkali copoly(5-sulfoisophthaloyl)-copoly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl)-copoly(propylene-succinate), alkali copoly(5-sulfoisophthaloyl)-copoly(butylenes-succinate), alkali copoly(5-sulfoisophthaloyl)-copoly(pentylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), poly(octylene-adipate), wherein alkali is a metal like sodium, lithium or potassium. Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

The crystalline polyester resin may be synthesized from an acid (dicarboxylic acid) component and an alcohol (diol) component. As used herein, an, "acid-derived component," indicates a constituent moiety that was originally an acid component before the synthesis of a polyester resin and an, "alcohol-derived component," indicates a constituent moiety that was originally an alcoholic component before the synthesis of the polyester resin.

The crystalline polyester resins may be synthesized from a combination of components selected from the above-mentioned monomer components, by using conventional known methods. Exemplary methods include the ester exchange method and the direct polycondensation method, which may be used singularly or in a combination thereof. The molar ratio (acid component/alcohol component) when the acid component and alcohol component are reacted, may vary depending on the reaction conditions. The molar ratio is usually about 1/1 in direct polycondensation. In the ester exchange method, a monomer such as ethylene glycol, neopentyl glycol or cyclohexanedimethanol, which may be distilled away under vacuum, may be used in excess.

For forming a crystalline polyester, suitable diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof and the like.

Examples of other dihydric dialcohols which may be utilized include bisphenol A, hydrogenated bisphenol A, bisphenol A ethylene oxide adduct, bisphenol A propylene oxide adduct, 1,4-cyclohexanediol, 1,4-cyclohexanedimethanol, diethylene glycol, propylene glycol, dipropylene glycol, 1,3-butanediol, neopentyl glycol, combinations thereof and the like.

The diol may be, for example, selected in an amount of from about 40 to about 60 mole %, in embodiments, from about 42 to about 55 mole %, in embodiments, from about 45 to about 53 mole % (although amounts outside of those ranges may be used). When present, an alkali sulfo-aliphatic diol may be selected in an amount of from about 0 to about 10 mole %, in embodiments, from about 1 to about 4 mole % of the resin.

Examples of organic diacids or diesters including vinyl diacids or vinyl diesters selected for the preparation of the crystalline resins include oxalic acid, succinic acid, malonic acid, glutaric acid, adipic acid, suberic acid, azelaic acid, sebacic acid, fumaric acid, dimethyl fumarate, dimethyl itaconate, 1,9-nonanedicarboxylic acid, 1,10-decanedicarboxylic acid, 1,1-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, and 1,18-octadecanedicarboxylic acid, as well as lower alkyl esters and acid anhydrides thereof cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof; and an alkali sulfo-organic diacid such as the sodio, lithio or potassio salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfoethanediol, 2-sulfopropanediol, 2-sulfobutanediol, 3-sulfopentanediol, 2-sulfohexanediol, 3-sulfo-2-methylpentanediol, 2-sulfo-3,3-dimethylpentanediol, sulfo-p-hydroxybenzoic acid, N,N-bis(2-hydroxyethyl)-2-amino ethane sulfonate, or mixtures thereof. The organic diacid may be selected in an amount of, for example, in embodiments from about 40 to about 60 mole %, in embodiments, from about 42 to about 52 mole %, in embodiments from about 45 to about 50 mole %.

Other acids are not particularly restricted, and examples thereof include conventionally known divalent carboxylic acids and dihydric alcohols, for example those described in "Polymer Data Handbook Basic Edition" (Soc. Polymer Science, Japan Ed.: Baihukan). Specific examples of the monomer components include, as divalent carboxylic acids, dibasic acids such as phthalic acid, isophthalic acid, terephthalic acid, naphthalene-2,6-dicarboxylic acid, naphthalene-2,7-dicarboxylic acid, and cyclohexanedicarboxylic acid, and anhydrides and lower alkyl esters thereof, as well as combinations thereof and the like.

The dicarboxylic acid may have a sulfonic acid group which may be effective for obtaining excellent dispersion of a coloring agent such as a pigment. Furthermore, when a whole resin is emulsified or suspended in water to prepare a toner mother particle, a sulfonic acid group, may enable the resin to be emulsified or suspended without a surfactant. Examples of such dicarboxylic acids having a sulfonic group include, but are not limited to, sodium 2-sulfoterephthalate, sodium 5-sulfoisophthalate and sodium sulfosuccinate. Furthermore, lower alkyl esters and acid anhydrides of such dicarboxylic acids having a sulfonic group, for example, are also usable. The content of the dicarboxylic acid having a sulfonic acid group may be from about 0.1% by mole to about 2% by mole, in embodiments from about 0.2% by mole to about 1% by mole. Here, "component mol %," or, "component mole %," indicates the percentage when the total amount of each of the components (acid-derived component and alcohol-derived component) in the polyester resin is assumed to be 1 unit (mole).

The crystalline resin may be present, for example, in an amount of from about 5 to about 50% by weight of the toner components, in embodiments, from about 10 to about 35% by weight of the toner components. The crystalline resin may possess various melting points of, for example, from about 30° C. to about 120° C., in embodiments, from about 50° C. to about 90° C. The crystalline resin may have an $M_n$ of, for example, from about 1,000 to about 50,000, from about 2,000 to about 25,000, and an $M_w$ of, for example, from about 2,000 to about 100,000, in embodiments, from about 3,000 to about 80,000. The molecular weight distribution ($M_w/M_n$) of the crystalline resin may be, for example, from about 2 to about 6, in embodiments, from about 3 to about 4.

Polycondensation catalysts which may be utilized in forming either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole % to about 5 mole % based on the starting diacid or diester used to generate the polyester resin.

One, two, or more toner resins may be used. In embodiments where two or more toner resins are used, the toner resins may be in any suitable ratio (e.g., weight ratio) such as for instance about 10% (first resin)/90% (second resin) to about 90% (first resin)/10% (second resin). A toner resin may comprise plural amorphous resins and a crystalline resin, in ratios selected as a design choice based on the properties desired in the toner.

Surfactants

In embodiments, colorants, waxes and other additives utilized to form toner compositions may be in dispersions including surfactants. Moreover, toner particles may be formed by emulsion aggregation methods where the resin and other components of the toner are placed in one or more surfactants, an emulsion is formed, toner particles are aggregated, coalesced, optionally washed and dried, and recovered.

One, two, or more surfactants may be utilized. The surfactants may be selected from ionic surfactants and nonionic surfactants. Any surfactant described above for use in forming the resin utilized as the polymeric coating for the carrier core may be utilized.

Colorants

Various known suitable colorants, such as dyes, pigments, mixtures of dyes, mixtures of pigments, mixtures of dyes and pigments, and the like, may be included in the toner. The colorant may be included in the toner in an amount of, for example, about 0.1 to about 35% by weight of the toner, from about 1 to about 15 wt % of the toner, from about 3 to about 10% by weight of the toner, although amounts outside those ranges may be utilized.

As examples of suitable colorants, mention may be made of carbon black like REGAL 330®; magnetites, such as Mobay magnetites MO8029™, M08060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there may be selected cyan, magenta, yellow, red, green, brown, blue or mixtures thereof. Generally, cyan, magenta, or yellow pigments or dyes, or mixtures thereof, are used. The pigment or pigments are generally used as water based pigment dispersions.

Specific examples of pigments include SUNSPERSE 6000, FLEXIVERSE and AQUATONE water based pigment dispersions from SUN Chemicals, HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E. D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colorants that may be selected are black, cyan, magenta, or yellow, and mixtures thereof. Examples of magentas are 2,9-dimethyl-substituted quinacridone and anthraquinone dye identified in the Color Index as CI-60710, CI Dispersed Red 15, diazo dye identified in the Color Index as CI-26050, CI Solvent Red 19, and the like. Illustrative examples of cyans include copper tetra(octadecyl sulfonamido) phthalocyanine, x-copper phthalocyanine pigment listed in the Color Index as CI-74160, CI Pigment Blue, Pigment Blue 15:3, and Anthrathrene Blue, identified in the Color Index as CI-69810, Special Blue X-2137, and the like. Illustrative examples of yellows are diarylide yellow 3,3-dichlorobenzidene acetoacetanilides, a monoazo pigment identified in the Color Index as CI-12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants may be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing, and the like.

Wax

Optionally, a wax may also be combined with the resin and optional colorant in forming toner particles. When included, the wax may be present in an amount of, for example, from about 1 wt % to about 25 wt % of the toner particles, in embodiments from about 5 wt % to about 20 wt % of the toner particles, although amounts outside those ranges may be utilized.

Waxes that may be selected include waxes having, for example, a weight average molecular weight of from about 500 to about 20,000, in embodiments from about 1,000 to about 10,000, although molecular weights outside these ranges may be utilized. Waxes that may be used include, for example, polyolefins such as polyethylene, polypropylene, and polybutene waxes such as commercially available from Allied Chemical and Petrolite Corporation, for example POLYWAX™ polyethylene waxes from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs wax and jojoba oil; animal-based waxes, such as beeswax; mineral-based waxes and petroleum-based waxes, such as montan wax, ozokerite, ceresin, paraffin wax, microcrystalline wax, and Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes also may be used in embodiments. Waxes may be included as, for example, fuser roll release agents.

Toner Preparation

The toner particles may be prepared by any method within the purview of one skilled in the art. Although embodiments relating to toner particle production are described herein with respect to emulsion-aggregation processes, any suitable method of preparing toner particles may be used, including chemical processes, such as suspension and encapsulation processes disclosed in U.S. Pat. Nos. 5,290,654 and 5,302,486, the disclosure of each of which hereby is incorporated by reference in entirety. In embodiments, toner compositions and toner particles may be prepared by aggregation and coalescence processes in which small-sized resin particles are aggregated to the appropriate toner particle size and then coalesced to achieve the final toner particle shape and morphology.

In embodiments, toner compositions may be prepared by emulsion-aggregation processes, such as a process that includes aggregating a mixture of an optional colorant, an optional wax and any other desired or required additives, and emulsions including the resins described above, optionally in surfactants as described above, and then coalescing the aggregate mixture. A mixture may be prepared by adding a colorant and optionally a wax or other materials, which also may be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 4 to about 5, although a pH outside this range may be utilized. Additionally, in embodiments, the mixture may be homogenized. If the mixture is homogenized, homogenization may be accomplished by mixing at about 600 to about 4,000 rpm, although speeds outside this range may be utilized. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, polyaluminum halides, such as, polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the $T_g$ of the resin.

The aggregating agent may be added to the mixture utilized to form a toner in an amount of, for example, from about 0.1% to about 8% by weight, in embodiments from about 0.2% to about 5% by weight, in other embodiments from about 0.5% to about 5% by weight, of the resin in the mixture, although amounts outside these ranges may be utilized.

To control aggregation and subsequent coalescence of the particles, in embodiments the aggregating agent may be metered into the mixture over time. For example, the agent may be metered into the mixture over a period of from about 5 to about 240 minutes, in embodiments from about 30 to about 200 minutes, although more or less time may be used as desired or required. The addition of the agent may also be done while the mixture is maintained under stirred conditions, in embodiments from about 50 rpm to about 1,000 rpm, in other embodiments from about 100 rpm to about 500 rpm, although speeds outside these ranges may be utilized and at a temperature that is below the glass transition temperature of the resin as discussed above, in embodiments from about 30° C. to about 90° C., in embodiments from about 35° C. to about 70° C., although temperatures outside these ranges may be utilized.

The particles may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for average particle size. The aggregation thus may proceed by maintaining the elevated temperature, or slowly raising the temperature to, for example, from about 30° C. to about 99° C., and holding the mixture at this temperature for a time from about 0.5 hours to about 10 hours, in embodiments from about hour 1 to about 5 hours (although times outside these ranges may be utilized), while maintaining stirring, to provide the aggregated particles. Once the predetermined desired particle size is reached, then the growth process is halted.

The growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example of from about 40° C. to about 90° C., in embodiments, from about 45° C. to about 80° C. (although temperatures outside those ranges may be utilized), which may be below the $T_g$ of the resin as discussed above.

Once the desired final size of the toner particles is achieved, the pH of the mixture may be adjusted with a base to a value of from about 3 to about 10, and in embodiments from about 5 to about 9, although a pH outside those ranges may be utilized. The adjustment of the pH may be utilized to freeze, that is, to stop, toner growth. The base utilized to stop toner growth may include any suitable base such as, for example, alkali metal hydroxides such as, for example, sodium hydroxide, potassium hydroxide, ammonium hydroxide, combinations thereof, and the like. In embodiments, ethylene diamine tetraacetic acid (EDTA) may be added to help adjust the pH to the desired values noted above.

In embodiments, a resin, including any resin described above for use in forming the toner, may be applied to the toner particles to form a shell thereover.

Coalescence

Following aggregation to the desired particle size and application of any optional shell, the particles may then be coalesced to the desired final shape, the coalescence being achieved by, for example, heating the mixture to a temperature of from about 45° C. to about 100° C., in embodiments, from about 55° C. to about 99° C. (although temperatures outside of those ranges may be used), which may be at or above the $T_g$ of the resins utilized to form the toner particles, and/or reducing the stirring, for example to from about 100 rpm to about 1,000 rpm, in embodiments, from about 200 rpm to about 800 rpm (although speeds outside of those ranges may be used). The fused particles may be measured for shape factor or circularity, such as with a Sysmex FPIA 2100 analyzer, until the desired shape is achieved.

Higher or lower temperatures may be used, it being understood that the temperature is a function of the resins used for the binder. Coalescence may be accomplished over a period of from about 0.01 to about 9 hours, in embodiments from about 0.1 to about 4 hours (although times outside of these ranges may be used).

After aggregation and/or coalescence, the mixture may be cooled to room temperature, such as from about 20° C. to about 25° C. The cooling may be rapid or slow, as desired. A suitable cooling method may include introducing cold water to a jacket around the reactor. After cooling, the toner particles may be optionally washed with water, and then dried. Drying may be accomplished by any suitable method for drying including, for example, freeze-drying.

Additives

In embodiments, the toner particles may also contain other optional additives, as desired or required. For example, the toner may include additional positive or negative charge control agents, for example, in an amount of from about 0.1 to about 10% by weight of the toner, in embodiments, from about 1 to about 3% by weight of the toner (although amounts outside of those ranges may be used). Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which hereby is incorporated by reference in entirety; organic sulfate and sulfonate compositions, including those disclosed in U.S. Pat. No. 4,338,390, the disclosure of which hereby is incorporated by reference in entirety; cetyl pyridinium tetrafluoroborates; distearyl dimethyl ammonium methyl sulfate; aluminum salts such as BONTRON E84™ or E88™ (Orient Chemical Industries, Ltd.); combinations thereof, and the like. Such charge control agents may be applied simultaneously with the shell resin described above or after application of the shell resin.

After formation, there also may be blended with the toner particles external additives including flow aid additives, which additives may be present on the surface of the toner particles. Examples of such additives include metal oxides, such as, titanium oxide, silicon oxide, aluminum oxides, cerium oxides, tin oxide, mixtures thereof, and the like; colloidal and amorphous silicas, such as AEROSIL®; metal salts and metal salts of fatty acids inclusive of zinc stearate, calcium stearate; and/or long chain alcohols such as UNILIN 700, and combinations thereof.

In general, silica may be applied to the toner surface for toner flow, enhancement of triboelectric charge, admix control, improved development and transfer stability, and higher toner blocking temperature. $TiO_2$ may be applied for improved relative humidity (RH) stability, control of triboelectric charge, and improved development and transfer stability. Zinc stearate, calcium stearate and/or magnesium stearate may optionally also be used as an external additive for providing lubricating properties, developer conductivity, enhancement of triboelectric charge, enabling higher toner charge and charge stability by increasing the number of contacts between toner and carrier particles. In embodiments, a commercially available zinc stearate known as Zinc Stearate L, obtained from Ferro Corporation, may be used. The external surface additives may be used with or without a coating.

Each of such external additives may be present in an amount of from about 0.1% by weight to about 5% by weight of the toner, in embodiments, of from about 0.25% by weight to about 3% by weight of the toner. In embodiments, the toners may include, for example, from about 0.1 wt % to about 5 wt % titania, from about 0.1 wt % to about 8 wt % silica, and from about 0.1 wt % to about 4 wt % zinc stearate.

Suitable additives include those disclosed in U.S. Pat. Nos. 3,590,000, 3,800,588, and 6,214,507, the disclosures of each of which hereby is incorporated by reference in entirety. Again, the additives may be applied simultaneously with the shell resin described above or after application of the shell resin.

In embodiments, toners of the present disclosure may be utilized as ultra low melt (ULM) toners. In embodiments, the dry toner particles having a core and/or shell may, exclusive of external surface additives, have one or more the following characteristics: (1) volume average diameter (also referred to as "volume average particle diameter") was measured for the toner particle volume and diameter differentials. The toner particles have a volume average diameter of from about 3 to about 25 μm, in embodiments from about 4 to about 15 μm, in other embodiments from about 5 to about 12 μm; and (2) number average geometric size distribution ($GSD_n$) and/or volume average geometric size distribution ($GSD_v$). In embodiments, the toner particles described in (1) above may have a particle size distribution with a lower number ratio GSD of from about 1.15 to about 1.38, in other embodiments, less than about 1.31. The toner particles of the present disclosure may also have a size such that the upper GSD by volume is from about 1.20 to about 3.20, in embodiments, from about 1.26 to about 3.11. Volume average particle diameter $D_{50v}$, GSDv and GSDn may be measured by means of a measuring instrument such as a Beckman Coulter MULTISIZER 3, operated in accordance with the manufacturer's instructions. Representative sampling may occur as follows: a small amount of toner sample, about 1 g, may be obtained and filtered through a 25 μm screen, then put in isotonic solution to obtain a concentration of about 10%, with the sample then run in a Beckman Coulter Multisizer 3. (3) Shape factor, SF1*a, of from about 105 to about 170, in embodiments, from about 110 to about 160. Scanning electron microscopy (SEM) may be used to determine the shape factor analysis of the toners by SEM and image analysis (IA). The average particle shapes are quantified by employing the following shape factor (SF1*a) formula: $SF1*a = 100\pi d^{2(4.4)}$, where A is the area of the particle and d is its major axis. A perfectly circular or spherical particle has a shape factor of exactly 100. The shape factor SF1*a increases as the shape becomes more irregular or elongated in shape with a higher surface area. (4) Circularity of from about 0.92 to about 0.99, in embodiments from about 0.94 to about 0.975. The instrument used to measure particle circularity may be an FPIA-2100 manufactured by Sysmex.

The characteristics of the toner particles may be determined by any suitable technique and apparatus and are not limited to the instruments and techniques indicated hereinabove.

In embodiments, the toner particles may have an $M_w$ in the range of from about 17,000 to about 60,000 daltons, an $M_n$ of from about 9,000 to about 18,000 daltons, and a MWD (a ratio of the $M_w$ to $M_n$ of the toner particles, a measure of the polydispersity, or width, of the polymer) of from about 2.1 to about 10 (although values outside of these ranges may be obtained). For cyan and yellow toners, the toner particles in embodiments may exhibit an $M_w$ of from about 22,000 to about 38,000 daltons, an $M_n$ of from about 9,000 to about 13,000 daltons, and a MWD of from about 2.2 to about 10 (although values outside of these ranges may be obtained). For black and magenta, the toner particles in embodiments may exhibit an $M_w$ of from about 22,000 to about 38,000 daltons, an $M_n$ of from about 9,000 to about 13,000 daltons and a MWD of from about 2.2 to about 10 (although values outside of those ranges may be obtained).

Toners produced in accordance with the present disclosure may possess excellent charging characteristics when exposed to extreme relative humidity (RH) conditions. The low-humidity zone (C zone) may be about 12° C./15% RH, while the high humidity zone (A zone) may be about 28° C./85% RH. Toners of the present disclosure may possess a parent toner charge per mass ratio (q/m) of from about −5 μC/g to about −80 μC/g, in embodiments, from about −10 μC/g to about −70 μm/g, and a final toner charging after surface additive blending of from −15 μm/g to about −60 μC/g, in embodiments, from about −20 μm/g to about −55 μC/g.

Developer

The toner particles may be formulated into a developer composition by combining them with the coated carriers of the present disclosure. For example, the toner particles may be mixed with the coated carrier particles to achieve a two-component developer composition. The carrier particles may be mixed with the toner particles in various suitable combinations. The toner concentration in the developer may be from about 1% to about 25% by weight of the developer, in embodiments from about 2% to about 15% by weight of the total weight of the developer, from about 3% to about 10%, with the carrier present in an amount of from about 80% to about 96% by weight of the developer, in embodiments from about 85% to about 95% by weight of the developer. In embodiments, the toner concentration may be from about 90% to about 98% by weight of the carrier. However, different toner and carrier percentages may be used to achieve a developer composition with desired characteristics.

Thus, for example, there may be formulated in accordance with the present disclosure, developers with resistivity as determined in a magnetic brush conducting cell of from about $10^9$ ohm-cm to about $10^{14}$ ohm-cm at 10 volts, in embodiments from about $10^{10}$ ohm-cm to about $10^{13}$ ohm-cm at 10 volts, and from about $10^8$ ohm-cm to about $10^{13}$ ohm-cm at 150 volts, in embodiments from about $10^9$ ohm-cm to about $10^{12}$ ohm-cm at 150 volts.

Toners including the carriers of the present disclosure may thus have triboelectric charges of from about 15 μC/g to about 60 μC/g, in embodiments, from about 20 μC/g to about 55 μC/g, from about 15 μC/g to about 70 μC/g.

Resistivity

To measure carrier conductivity or resistivity, about 50 to about 150 grams of the carrier may be placed in a fixture designed to mimic the developer housing in a xerographic printer. The conductivity fixture can consist of a magnetic roll (or mag roll) which holds the carrier or developer on the roll surface by magnetism. With rotation of an outer sleeve, the roll carries the carrier or developer past a trimmer bar, metering a constant mass per unit area on the roll. The trimmer bar to roll spacing may be from about 0.05 in to about 0.1 in. The carrier or developer on the roll then is swept past a top-plate electrode with a defined gap with the roll. The inter-electrode gap can be of any size, such as, from about 0.05 in to about 0.1 in. A voltage, from about −3000 Volts to about +3000 Volts may be applied between the top-plate electrode and the mag roll, and the resulting current measured. In that manner, a magnetic brush may be created that resembles the magnetic brush formed in an SCMB xerographic printer.

Conductivity in (ohm cm)$^{-1}$ may be obtained by multiplying current in amperes, by the interelectrode gap in centimeters, and divided by the electrode area in cm$^2$ and by the applied voltage. Resistivity may be obtained as the inverse of the conductivity and may be measured in ohm-cm. The applied voltage may be varied from about −3000 volts to about +3000 volts, and the current-voltage or "I-V curve," recorded.

In accordance with the present disclosure, a carrier may have a resistivity of from about $10^9$ to about $10^{14}$ ohm-cm measured at 750 volts with a trimmer bar and inter-electrode gap of 0.1 in, from about $10^7$ to about $10^{11}$ ohm-cm measured at 750 volts with a trimmer bar and inter-electrode gap of 0.05 in. The applied voltage at which the current exceeds 1 mA can be referred to as the breakdown voltage. In embodiments, as measured using an inter-electrode gap of 0.05 in, the breakdown voltage can be in excess of 3000 volts.

In embodiments, A zone charge may be from about −15 to about −60 μC/g, in embodiments, from about −20 to about −55 μm/g, while C zone charge may be from about −15 to about −60 μm/g, in embodiments, from about −20 to about −55 μC/g. The ratio of A zone charge to C zone charge, sometimes referred to herein, in embodiments, as the RH ratio, may be from about 0.40, to about 1.0, in embodiments, from about 0.6, to about 0.8.

Imaging

The carrier particles of the present invention may be selected for a number of different imaging systems and devices, such as electrophotographic copiers and printers, inclusive of high speed color electrophotographic systems, printers, digital systems, combination of electrophotographic and digital systems, and wherein colored images with excellent and substantially no background deposits are achievable. Developer compositions including the carrier particles illustrated herein and prepared, for example, by a dry coating process may be useful in electrostatographic or electrophotographic imaging systems, especially electrophotographic imaging and printing processes, and digital processes. Additionally, the developer compositions of the present disclosure including the conductive carrier particles of the present disclosure may be useful in imaging methods wherein relatively constant conductivity parameters are desired. Furthermore, in the aforementioned imaging processes the toner triboelectric charge with the carrier particles may be preselected, which charge is dependent, for example, on the polymer composition applied to the carrier core, and optionally the type and amount of the conductive component selected.

Imaging processes include, for example, preparing an image with an electrophotographic device including a charging component, an imaging component, a photoconductive component, a developing component, a transfer component, and a fusing component. In embodiments, the development component may include a developer prepared by mixing a carrier with a toner composition described herein. The electrophotographic device may include a high speed printer, a black and white high speed printer, a color printer, and the like.

Once the image is formed with toners/developers via a suitable image development method such as any one of the aforementioned methods, the image may then be transferred to an image receiving medium such as paper and the like. In embodiments, the toners may be used in developing an image in an image-developing device utilizing a fuser roll member. Fuser roll members are contact fusing devices that are within the purview of those skilled in the art, in which heat and pressure from the roll may be used to fuse the toner to the image-receiving medium. In embodiments, the fuser member may be heated to a temperature above the fusing temperature of the toner, for example to temperatures of from about 70° C. to about 160° C., in embodiments from about 80° C. to about 150° C., in other embodiments from about 90° C. to about 140° C. (although temperatures outside of these ranges may be used), after or during melting onto the image receiving substrate.

Images, especially colored images obtained with the developer compositions of the present invention in embodiments possess, for example, acceptable solids, excellent halftones, and desirable line resolution with acceptable or substantially no background deposits, excellent chroma, superior color intensity, constant color chroma and intensity over extended time periods, such as 1,000,000 imaging cycles, and the like.

The following Examples are being submitted to illustrate embodiments of the present disclosure. The Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Preparation of Control Latexes (No Surfactant Portioning)

A latex emulsion comprised of polymer particles generated from the emulsion polymerization of cyclohexylmethacrylate and 2-(dimethyl amino) ethyl methacrylate was prepared as follows.

A surfactant solution consisting of 0.75 parts sodium lauryl sulfate (anionic emulsifier) and 381 parts of deionized (DI) water was prepared by mixing for 10 minutes in a beaker. The aqueous surfactant solution was transferred into the reactor. The reactor was continuously purged with nitrogen while being stirred at 450 rpm. In a separate container were combined 112 parts of cyclohexylmethacrylate and 1 part of 2-(dimethyl amino) ethyl methacrylate as described in Table 1. Ten % by weight of that solution was added to the aqueous surfactant mixture as a seed. The reactor then was heated up to 65° C. at a controlled rate and held there. Separately, 0.47 parts of ammonium persulfate initiator were dissolved in 4 parts of DI water to form the initiator solution. The initiator solution then slowly is charged into the reactor and after 40 minutes the rest of the resin mixture was continuously fed into the reactor using a metering pump at a rate of 0.8% by weight/min Once all of the monomer emulsion was charged into the main reactor, the temperature was held at 65° C. for an additional 2 hours to complete the reaction. Full cooling then was applied and the reactor temperature was reduced to 35° C. A liquid sample was used to measure particle size on a Nanotrac Particle Size analyzer (Microtac) and $\zeta$ potential on a Zetasizer (Malvern), while the rest of the product was dried to a powder using a freeze drier.

Preparation of Latexes Using Surfactant Partitioning

Latex emulsions comprised of polymer particles generated from the emulsion polymerization of cyclohexylmethacrylate and 2-(dimethyl amino) ethyl methacrylate with portioned surfactant were prepared as follows.

In Reactor 1 were added a predetermined amount of sodium lauryl sulfate as shown in Table 1 and 25300 parts of DI water. Reactor 1 was heated to 65° C. and stirred at 450 rpm. In Reactor 2 were added a predetermined amount of sodium lauryl sulfate surfactant as shown in Table 1, 12800 parts DI water, 11200 parts cyclohexylmethacrylate monomer and 105 parts 2-(dimethyl amino) ethyl methacrylate. Reactor 2 was stirred at 1200 rpm to emulsify the monomer/aqueous surfactant solution. One weight % of Reactor 2 was taken out and added to Reactor 1 as a seed. Then to Reactor 1 was added 47 parts ammonium persulfate initiator dissolved in 400 parts DI water. After 40 minutes of Reactor 1 stirring at 450 rpm and 65° C., the contents of Reactor 2 were slowly metered into Reactor 1 using a pump at a rate of 0.8 wt % per minute. Once all the monomer emulsion was charged into the main reactor, the temperature was held at 65° C. for an additional 2 hours to complete the reaction. Full cooling then was applied and the reactor temperature was reduced to 35° C. A liquid sample was used to measure particle size on a Nanotrac Particle Size Analyzer (Microtrac) and $\zeta$ potential on a Zetasizer (Malvern), while the rest of the product was dried to a powder form using a freeze drier.

Preparation of Carrier and Developer

In a 250 ml polyethylene bottle were added 120 grams of 35 μm ferrite core particles and 0.912 grams of a polymer latex as described in Table 1. The bottle then was sealed and loaded into a C-zone TURBULA. The TURBULA mixer was run for 45 minutes to disperse the powder onto the carrier particles. Next, a Haake mixer was set up with the following conditions: set temp 200° C. (all zones), 30 minute batch time, 30 rpm with high shear rotors. After the Haake reached the appropriate temperature, the mixer rotation was started and the blend was transferred from the TURBULA into the Haake mixer. After 45 minutes, the carrier was discharged from the mixer and was sieved through a 45 μm screen.

Carrier designs were evaluated with ultra low melt (ULM) emulsion aggregation (EA) cyan Xerox 700 toner. Developers were conditioned overnight in A zone and C zone and then 60 minute aging was done using the TURBULA method. The charging results were compared to three different control carriers. Control 1 and Control 2 are the carriers made using an emulsion polymerization latex from a 100 gallon experiment and a 1 liter bench top experiment, respectively, which did not partition the surfactant. The carrier was powder coated Charging results are shown in Table 2.

TABLE 1

Latex formulation and properties for carrier coating

| Latex | SLS Reactor 1 (parts) | SLS Reactor 2 (parts) | % extra SLS | Size (nm) | $T_g$ onset (° C.) | $\zeta$ Potential | Emulsion after 30 days |
|---|---|---|---|---|---|---|---|
| Control 1 | 75 | 0 | 0 | 90 | 98.1 | −53.1 | Gel |
| Control 2 | 75 | 0 | 0 | 90 | 100.2 | −52.8 | Gel |
| Exp 1 | 32 | 70 | 36 | 87 | 99.7 | −64.1 | Stable |
| Exp 2 | 32 | 100 | 76 | 86 | 99.1 | −66 | Stable |
| Exp 3 | 24 | 150 | 131 | 105 | 96.6 | −67 | Stable |
| Exp 4 | 24 | 300 | 331 | 101 | 93.3 | −64 | Stable |

All latexes had a target particle size of about 90 nm. As the SLS surfactant amount increased, $T_g$ onset decreased. Latexes which did not use partitioning of the surfactant were not stable for one month and turned into space filling gels. Latexes that used latex partitioning and extra surfactant were stable for at least 30 days or longer.

It is known in colloid chemistry that to have a stable dispersion, particle $\zeta$ potential should be higher than +30 or lower than −30 mV. However, other factors may play a role in stable particle suspensions, such as, type of surfactant, chemistry of the resin and the like. In view of the above, partitioning of the surfactant into two parts demonstrated that: 1) addition of more surfactant does not affect particle size and 2) reduction in $\zeta$ potential to lower than −60 mV can be achieved which is required to provide latex stability. Partitioning of surfactant also improved charge.

TABLE 2

Charging Results

| Toner | A zone q/d | A zone q/m | C zone q/d | C zone q/m | RH Ratio q/d | RH Ratio q/m |
|---|---|---|---|---|---|---|
| Control 1, no partitioning, 100 gallon | 7.7 | 40.7 | 19.5 | 77.3 | 0.40 | 0.53 |
| Control 2, no partitioning, 1 liter | 8.1 | 40.1 | 18.7 | 78.8 | 0.43 | 0.51 |
| 36% SLS, partitioned | 9.3 | 43.9 | 20.6 | 82.8 | 0.45 | 0.53 |
| 76% SLS, partitioned | 7.9 | 42.6 | 17.5 | 72.6 | 0.45 | 0.59 |
| 131% SLS, partitioned | 7.8 | 39.4 | 15.9 | 70.0 | 0.49 | 0.56 |
| 331% SLS, partitioned | 5.7 | 30.9 | 11.0 | 47.6 | 0.52 | 0.65 |

The data demonstrate that of the surfactant used and the amounts tested, 36% additional surfactant in the formulation is satisfactory. Conductivity at 750V and voltage breakdown data for the carriers were analyzed and revealed that the 36% carrier had the highest charge and is the most resistive (and hence, best coated). The best voltage breakdown of that tested was also exhibited by the 36% SLS carrier. The carrier made with 36% SLS had the best charge.

It will be appreciated that several of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

All references cited herein are herein incorporated by reference in their entireties.

We claim:

1. A carrier latex resin comprising a powder comprising at least one anionic surfactant, at least one aliphatic cycloacrylate and at least one acidic acrylate, wherein said resin comprises particles greater than about 85 nm in size and a ζ potential lower than about −55 mV.

2. The carrier latex resin of claim 1, wherein said particles are greater than about 90 nm in size.

3. The carrier latex resin of claim 1, comprising a ζ potential lower than about −60 mV.

4. The carrier latex of claim 1, wherein said at least one anionic surfactant is selected from the group consisting of sodium lauryl sulfate, sodium dodecylbenzene sulfonate, sodium dodecylnaphthalene sulfate, dialkyl benzenealkyl sulfates and sulfonates, abietic acid; alkyldiphenyloxide disulfonate, branched sodium dodecyl benzene sulfonates and combinations thereof.

5. The carrier latex of claim 1, wherein the at least one aliphatic cycloacrylate is selected from the group consisting of cyclohexylmethacrylate, cyclopropyl acrylate, cyclobutyl acrylate, cyclopentyl acrylate, cyclohexyl acrylate, cyclopropyl methacrylate, cyclobutyl methacrylate, cyclopentyl methacrylate, isobornyl methacrylate, isobornyl acrylate and combinations thereof.

6. The carrier latex of claim 1, wherein the at least one acidic acrylate is selected from the group consisting of acrylic acid, methacrylic acid, β-carboxyethyl acrylate and combinations thereof.

7. The carrier latex of claim 1, further comprising a pigment.

8. A coated carrier comprising a core and the carrier latex resin of claim 1.

9. The coated carrier of claim 8, wherein said core comprises iron, steel, copper, zinc, strontium, barium a magnetite, nickel, zircon, silica, glass, mixtures thereof or combinations thereof.

10. A developer comprising the coated carrier of claim 8 and a toner.

11. The developer of claim 10, wherein the toner is an emulsion aggregation toner.

12. The developer of claim 10 which is an ultra low melt developer.

13. A method for preparing a carrier latex resin comprising:
a) mixing at least one first anionic surfactant in a mixing vessel;
b) combining at least one second anionic surfactant and, at least one aliphatic cycloacrylate and at least one acidic acrylate to form a mixture;
c) transferring a portion of the mixture to the mixing vessel to form a carrier latex seed;
d) optionally, adding an initiator to the carrier latex seed; and
e) mixing the remaining portion of the mixture in the mixing vessel to form an emulsion comprising carrier latex particles;

wherein said emulsion comprises a ζ potential less than about −55 mV; said carrier latex particles are greater than about 85 nm in size; and wherein transferring the remaining portion of the mixture into the mixing vessel of step e) increases surfactant loading without impacting latex resin size as compared to a latex resin prepared in the absence of partitioning of surfactant.

14. The method of claim 13, wherein said at least one first and said at least one second anionic surfactants each is selected from the group consisting of sodium lauryl sulfate, sodium dodecylbenzene sulfonate, sodium dodecylnaphthalene sulfate, dialkyl benzenealkyl sulfates and sulfonates, abietic acid, alkyldiphenyloxide disulfonate, branched sodium dodecyl benzene sulfonates and combinations thereof.

15. The method of claim 13, wherein the at least one aliphatic cycloacrylate is selected from the group consisting of cyclohexylmethacrylate, cyclopropyl acrylate, cyclobutyl acrylate, cyclopentyl acrylate, cyclohexyl acrylate, cyclopropyl methacrylate, cyclobutyl methacrylate, cyclopentyl methacrylate, isobornyl methacrylate, isobornyl acrylate, and combinations thereof.

16. The method of claim 13, wherein the at least one acidic acrylate is selected from the group consisting of acrylic acid, methacrylic acid, β-carboxyethyl acrylate and combinations thereof.

17. The method of claim 13, further comprising drying the particles to form a powder.

18. A method of preparing a coated carrier comprising contacting the latex resin of claim 1 with a core.

19. The method of claim 18, further comprising fusing the resin to the core and optionally heating the fused core and resin to permit flow of the resin over the core.

20. The method of claim 19, wherein contacting is selected from the group consisting of cascade roll mixing, tumbling, milling, shaking, electrostatic powder cloud spraying, fluidized bed, electrostatic disc processing, electrostatic curtains, and combinations thereof: and fusing is selected from the group consisting of mechanical impaction, electrostatic attraction and a combination thereof.

* * * * *